United States Patent
Fuller et al.

(10) Patent No.: US 9,934,280 B2
(45) Date of Patent: Apr. 3, 2018

(54) JOIN ORDER RESTRICTIONS

(75) Inventors: Matthew Steven Fuller, Medfield, MA (US); Andrew Allinson Lamb, Boston, MA (US); Lakshmikant Shrinivas, Billerica, MA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 1260 days.

(21) Appl. No.: 13/469,641

(22) Filed: May 11, 2012

(65) Prior Publication Data

US 2012/0290559 A1 Nov. 15, 2012

Related U.S. Application Data

(60) Provisional application No. 61/485,812, filed on May 13, 2011.

(51) Int. Cl.
*G06F 17/30* (2006.01)

(52) U.S. Cl.
CPC ............... *G06F 17/30498* (2013.01)

(58) Field of Classification Search
USPC ........................................................ 707/714
See application file for complete search history.

(56) References Cited

U.S. PATENT DOCUMENTS

| | | | |
|---|---|---|---|
| 5,594,898 A * | 1/1997 | Dalal et al. | 707/696 |
| 6,516,310 B2 | 2/2003 | Paulley | |
| 6,618,719 B1 * | 9/2003 | Andrei | |
| 6,754,652 B2 | 6/2004 | Bestgen et al. | |
| 7,330,848 B2 | 2/2008 | Chaudhuri et al. | |
| 7,363,289 B2 | 4/2008 | Chaudhuri et al. | |
| 7,562,073 B2 | 7/2009 | Woehler et al. | |
| 2003/0187831 A1 * | 10/2003 | Bestgen | G06F 17/30463 |
| 2004/0186722 A1 * | 9/2004 | Garber | G06F 17/30675 |
| | | | 704/270.1 |
| 2005/0125398 A1 * | 6/2005 | Das | G06F 17/30306 |
| 2010/0094829 A1 | 4/2010 | Castellanos et al. | |
| 2010/0131490 A1 | 5/2010 | Lamb et al. | |
| 2011/0055199 A1 * | 3/2011 | Siddiqui | G06F 17/30498 |
| | | | 707/714 |
| 2011/0137890 A1 | 6/2011 | Bestgen et al. | |

* cited by examiner

*Primary Examiner* — Amresh Singh

(57) ABSTRACT

A query that is submitted to a database is analyzed so as to determine a join order restriction. The join order restriction is associated with a join between two tables of a plurality of tables of the database that participate in the query. The join order restriction constrains its associated join to be executed prior to another join of the query. At least one join plan is generated, the join plan being constrained by the join order restriction. Different join plans include different join orders. A join plan is selected from among the join plans for execution of the query.

16 Claims, 6 Drawing Sheets

JOIN ORDER RESTRICTIONS

CROSS REFERENCE TO RELATED APPLICATIONS

The present invention claims the priority benefit of U.S. provisional patent application No. 61/485,812 filed on May 13, 2011, which is incorporated in its entirety herein by reference.

BACKGROUND

A database system may include data that is organized in various tables. Each table typically includes one or more rows (also known as tuples or records) that include a set of related data (e.g. related to a single entity). The data for each row may be arranged in a series of columns or fields, wherein each column includes a particular type of data (e.g. type of characteristic of an entity).

A table may contain data that is related to data in another table. For example, in a first table each row may represent an individual item (e.g. person, object, or event). In a second table, each row may represent a classification group (e.g. organization to which person belongs, places where objects may be located, time periods where events may occur). Tables of a database may be related to one another. For example, a column of the first table may associate each individual item represented there by a reference to one of the classification groups in the second table.

A query to the database may retrieve data that is related in a defined manner from different tables of the database. For example, a query may be expressed in SQL (Structured Query Language) or in another form. A query may be represented as a joining of the tables that are addressed by the query. For example, two tables may be joined by selecting a row of each table that satisfies a criterion (e.g. a particular column value in the row) to form a row in a joined table. In the above example, joining the first and second tables may result, e.g., in a joined table in which a row includes a characteristic of an item from the first table together with a characteristic of a group with which that item is associated. In the case of a complex join operation (e.g. where several tables are joined in a sequence of individual join operations) the join operation, and thus the query, may be optimized by modifying an order in which the various individual join operations are executed.

DETAILED DESCRIPTION

Figure 1B:
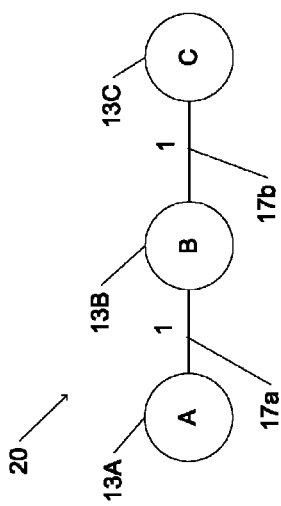
FIG. 1B shows a join graph that is derived from query that is represented by the join tree of FIG. 1A.

In accordance with an example of application of join order restrictions, a database includes a query optimizer for optimizing a query that is submitted (the input query) to a database before the query is run by the query execution engine. For example, a query may be submitted to the database in a form that is understandable to a user or programmer that submits the query. The query as submitted may be representable as a series of joins between the tables of the database that participate in the query. In optimizing a query, a query optimizer may change the order of joins between the tables and evaluate an efficiency of the query for each join order. For example, a cost function that is indicative of efficiency may be calculated for each join order that the optimizer evaluates. Comparison of the calculated cost functions for each evaluated join order may determine which of the join orders result in increased efficiency (or optimum efficiency) in execution of the query.

However, in order to reliably obtain the desired result of the query, any evaluated join order should not modify a result of the query. Thus, an example of join order restrictions may be applied by the query optimizer so as to restrict evaluated join orders to those join orders that do not affect the result of the query.

For example, a query may be expressible as a series of joins that includes only inner joins. An inner join is based on a join-predicate (e.g. in which a row is selected from a first table to be joined with a row from a second table when a particular column value of the row from the first table is equal to a particular column value of the row from the second table). Inner joins may be freely reordered (commuted and re-associated) without affecting the results of the query. Thus, in this example, join order restrictions would not be required and an optimizer may freely reorder the joins to obtain an optimized query.

Consider a simple example of a query to a database that includes three tables: table A, table B, and table C. Each of tables A, B, and C includes a single row and two columns. The columns of table A are labeled a and b, the contents of each column of its single row having a value of 1. Similarly, columns of table B are labeled x and y with contents of each column of the single row having a value of 2. Similarly, columns of table C are labeled p and q with contents of each column of the single row having a value of 3. Tables A, B, and C may be represented as follows:

| A | |
|---|---|
| a | b |
| 1 | 1 |

| B | |
|---|---|
| x | y |
| 2 | 2 |

| C | |
|---|---|
| p | q |
| 3 | 3 |

A freely re-orderable query that is submitted to this database may be expressed as:

select a, x, p from (A join B on A.a=B.x) join C on B.y=C.p.

This freely re-orderable query includes only inner joins.

The joins of a query as submitted may be visualized as a join tree. A join tree unambiguously represents the join evaluation order of the query. For example, the join tree may be derived from the syntactic structure of an SQL query or from a transformation of another join tree. In the join tree, each leaf represents a table that participates in the query and inner nodes represent joins. Each join node is connected by two incoming edges (below the node) to the left input and right input to the join. The inputs may be tables (leaves) or other joins (nodes). The structure of the tree indicates that an input to a join node is to be processed before the join that is indicated by that join node.

Figure 1A:
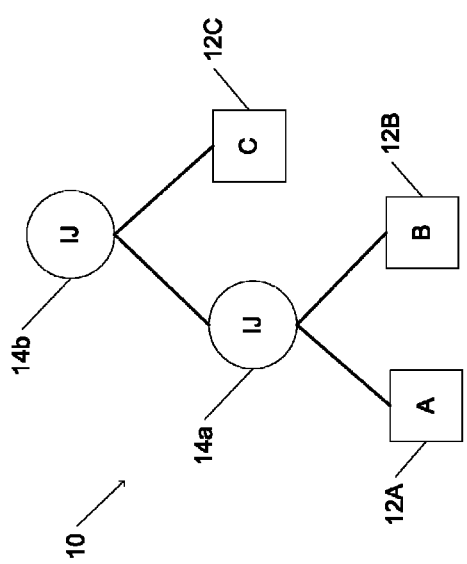
FIG. 1A shows a join tree that represents a query.

FIG. 1A shows a join tree that represents a freely re-orderable query. Join tree 10 corresponds to the freely re-orderable query of the above example.

Join tree 10 includes leaves 12A, 12B, and 12C corresponding to tables A, B, and C of the above example, respectively. Node 14a represents an inner join between tables A and B. Node 14b represents an inner join between the inner join represented by node 14a, and table C. The join tree represents the query as submitted.

An optimizer is capable of reordering joins and of evaluating the reordered query in light of an optimization criterion (e.g. as determined by a cost function). A reordering of the joins that yields an optimal query as determined by the optimization criterion may be selected for execution. For the purpose of use by the optimizer, the joins may be organized in a form that may be represented by a join graph. In a join graph, a node may represent a table, and an edge connecting two nodes represents a join between the objects that are represented by the nodes. In the case that the edge represents an inner join, no directionality is indicated on the edge.

FIG. 1B shows a join graph that is derived from a query that is represented by the join tree of FIG. 1A. In join graph 20, nodes 13A, 13B, and 13C correspond to leaves 12A, 12B, and 12C, representing tables A, B, and C, respectively. Edge 17a represents an inner join between table A and table B. Edge 17b represents an inner join between table B and table C.

The number above each of edges 17a and 17b represents a priority, herein referred to as a rank, that is assigned to each of the corresponding joins (where a numerically low rank implies high priority). Since both of edges 17a and 17b are assigned a rank of 1, no priority among the corresponding joins is indicated. Thus, tables A and B may be joined before joining the result of the join with table C, or tables B and C may be joined before joining the result of the join with table A. This is a consequence of the associative property of inner joins.

Another example of a query may be expressible as a series of joins where at least one of the joins is an outer join (e.g. in which a row is selected from one of the tables whether or not a join-predicate or join criterion is satisfied). A series of joins that includes an outer join may be neither commutative nor associative. In this case, unrestricted reordering of joins in a series of joins that includes outer joins could result in nonequivalent joined tables, affecting the result of the query. In this example, therefore, a join order restriction may be applied by the optimizer so as to restrict evaluation to those join orders that would yield that same result as the query as submitted.

An example of a non-reorderable query that is submitted to this database, using the tables A, B, and C, and their columns as described in the previous example, may be expressed as:

select a, x, p from (A left join B on A.a=B.x) join C on B.y=C.p.

The left join is performed first, followed by the inner join, and results in zero rows:

| a | x | p |
|---|---|---|
| (0 rows) | | |

A rearrangement (re-association) of the query may be expressed as:

select a, x, p from A left join (B join C on B.y=C.p) on A.a=B.x.

Since the inner join is performed first and is followed by the left join, a single row results:

| a | x | p |
|---|---|---|
| 1 | | |

Thus, in such a case of a non-reorderable query, reordering the joins results in modification of the results. Use of join order restrictions by a query optimizer would prevent such a reordering.

Figures 2A, 2B:
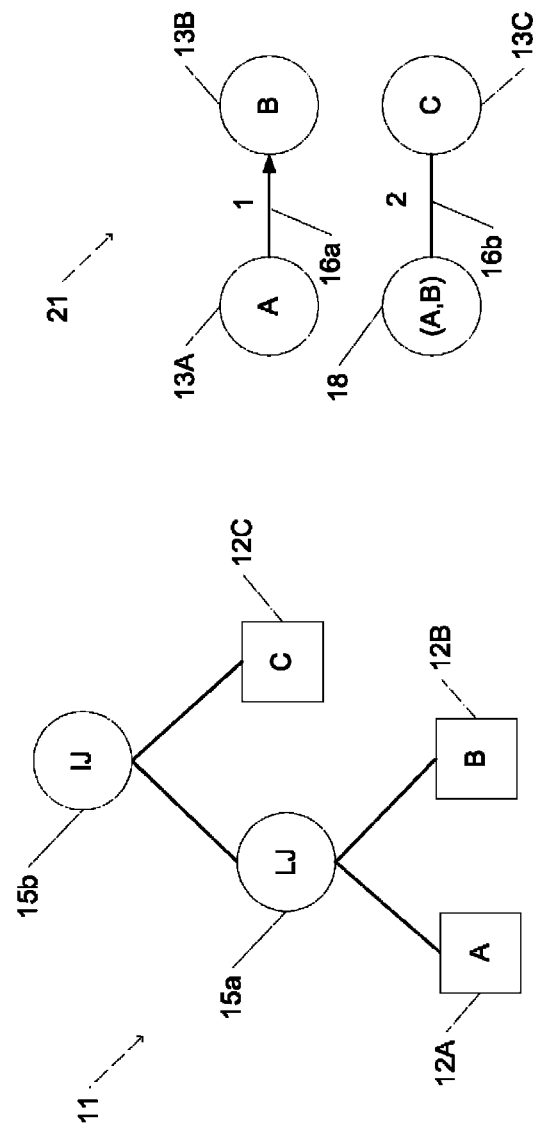
FIG. 2A shows a join tree that represents a query to which an example of a join order restriction is applicable.
FIG. 2B shows a join graph with a join order restriction that is derived from a query that is represented by the join tree of FIG. 2A.

FIG. 2A shows a join tree that represents a non-reorderable query to which an example of a join order restrictions is applicable. Join tree 11 corresponds to the non-reorderable query as submitted in the above example.

Join tree 11 includes leaves 12A, 12B, and 12C corresponding to tables A, B, and C, respectively. Node 15a represents a table A left joined to table B. Node 15b represents the result of the left join that is represented by node 15a, joined by an inner join to table C.

FIG. 2B shows a join graph with a join order restriction that is derived from the non-reorderable query that is represented by the join tree of FIG. 2A.

In join graph 21, nodes 13A, 13B, and 13C correspond to leaves 12A, 12B, and 12C, representing tables A, B, and C, respectively. Directed edge 16a from node 13A to node 13B represents a left join of table A to table B. Join graph 21 includes join order restriction node 18, connected by undirected edge 16b to node 13C. Join order restriction node 18 represents the left join of table A to table B. Undirected edge 16b indicates that the result of the left join is joined by an inner join to table C. Thus, join graph 21 represents an organization of the query in which the left join of table A to table B is constrained to be executed prior to the inner join with table C. This join order is indicated by the rank of 1 that is assigned to directed edge 16a, and the rank of 2 that is assigned to undirected edge 16b. The ranking is interpreted by the query optimizer as constraining the join order from any join order that would yield a result that is different from that of the query as submitted.

A query optimizer may be configured to generate and evaluate various join orders in order to identify an optimum join order. A submitted query may be interpreted to identify join order restrictions. For example, a submitted query may be examined in a recursive manner. The recursive examination may be visualized as traversing a join tree that represents the submitted query. Each node of the join tree may be examined in light of a set of conditions. A node may be incorporated into a join graph representation as a join order restriction if predetermined conditions of the set are satisfied.

A query optimizer may be configured with a join ranker. A join ranker may assign a priority or rank (e.g. where a numerically low rank implies higher priority) to each join of a join graph that is derived from a join tree. If one join is assigned a numerically lower rank or higher priority than another join, then the join with the lower rank must be performed prior to the join with the higher rank. Equal ranking of joins of a join graph indicates that each equally ranked join may be performed prior to another equally ranked join with equivalent results. A join ranker for use with join order restrictions assigns a rank to a join in light of any generated join order restrictions. Thus, a join that is indicated by a join order restriction is performed prior to a join of a join order restriction node to another node (e.g. that represents a table or another join order restriction).

A query optimizer may include a join generator. The join generator may generate a join plan that corresponds to each allowed order of joins, or to each of a subset of such join orders, that result from a join graph. The join plans include join orders in which the joins are ordered in accordance with the ranking that is assigned by the join ranker to each join of the join graph. If two or more joins are assigned equal ranks by the join ranker, then the join generator may generate separate join plans in which the equally ranked joins are performed in different orders.

Each join plan that is generated by the join generator may be evaluated in light of an optimization criterion, such as a cost function. For example, the optimization criterion may be based at least partially on factors such as organization (e.g. replication, segmentation, indexing) of the tables that participate in the query. Evaluation of the join plans may indicate that the optimization criterion for one of the join plans is optimal (e.g. lowest cost). The query that corresponds to that join plan may be selected by the query optimizer for execution.

Figure 3:
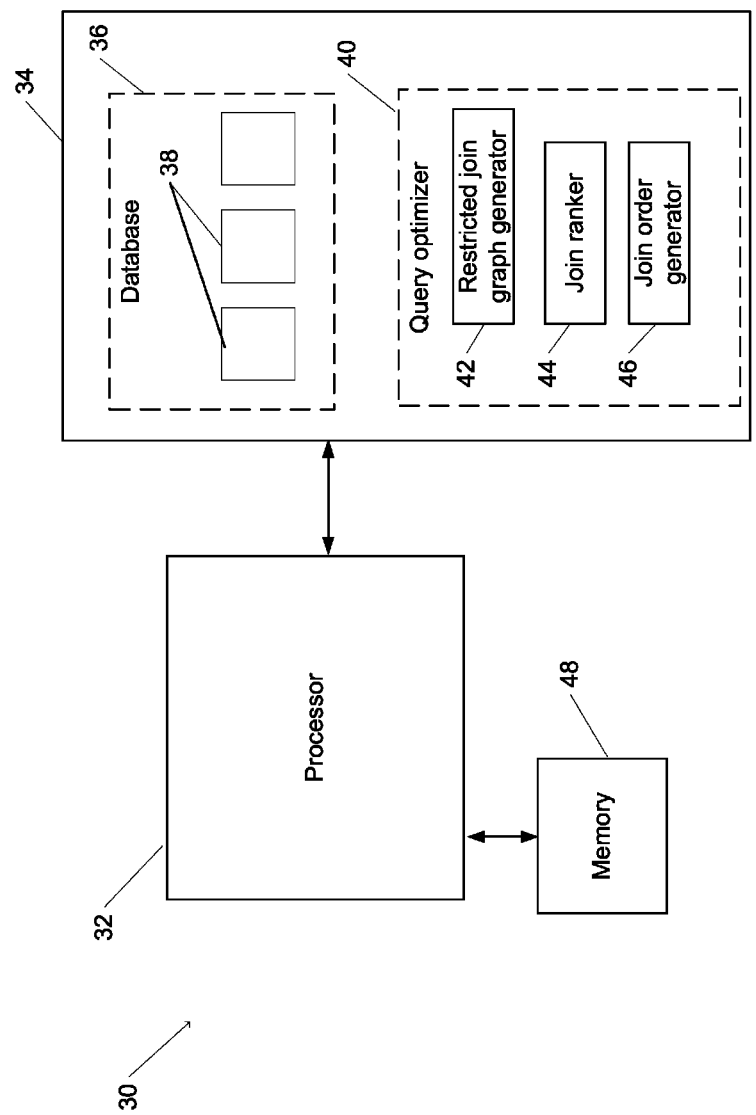
FIG. 3 is a schematic diagram of a system for application of join order restrictions in query optimization.

FIG. 3 is a schematic diagram of a system for application of join order restrictions in query optimization.

Query optimization system 30 includes a processor 32. For example, processor 32 may include one or more processing units, e.g. of one or more computers. Processor 32 may be configured to operate in accordance with programmed instructions stored in memory 48. Processor 32 may be capable of executing an application for query optimization on the basis of join order restrictions.

Processor 32 may communicate with memory 48. Memory 48 may include one or more volatile or nonvolatile memory devices. Memory 48 may be utilized to store, for example, programmed instructions for operation of processor 32, data or parameters for use by processor 32 during operation, or results of operation of processor 32

Processor 32 may communicate with data storage device 34. Data storage device 34 may include one or more fixed or removable nonvolatile data storage devices. For example, data storage device 34 may include a non-transitory computer readable medium for storing program instructions for operation of processor 32. Data storage device 34 may be utilized to store data or parameters for use by processor 32 during operation, or results of operation of processor 32.

For example, data storage device 34 may be utilized to store all or part of database 36. Database 36 may include one or more data tables 38. Data tables 38 may include tables that are replicated such that multiple copies are stored on different data storage devices (all of which may be considered to be included in data storage device 34). Data tables 38 may include segmented tables in which different segments of a data table 38 are stored on different data storage devices.

Programmed instructions stored on data storage device 34 may include instructions for a query optimizer 40 that includes a restricted join graph generator module 42 for generating a re-orderable representation of a submitted query that may be visualized as a join graph and that may incorporate a join order restriction, a join ranker module 44 for assigning a rank to each join of the query at least partially on the basis of generated join order restrictions, or a join order generator module 46 for generating a join plan that is constrained by the rank that is assigned to each join. It is noted that data storage device 34 may be remote from processor 32. In such cases data storage device 34 may be a storage device of a remote server storing restricted join graph generator module 42, join ranker module 44, or join order generator module 46 in the form of an installation package or packages that can be downloaded and installed for execution by processor 32.

In operation, processor 32 may execute a method for query optimization on the basis of join order restrictions.

Figure 4:
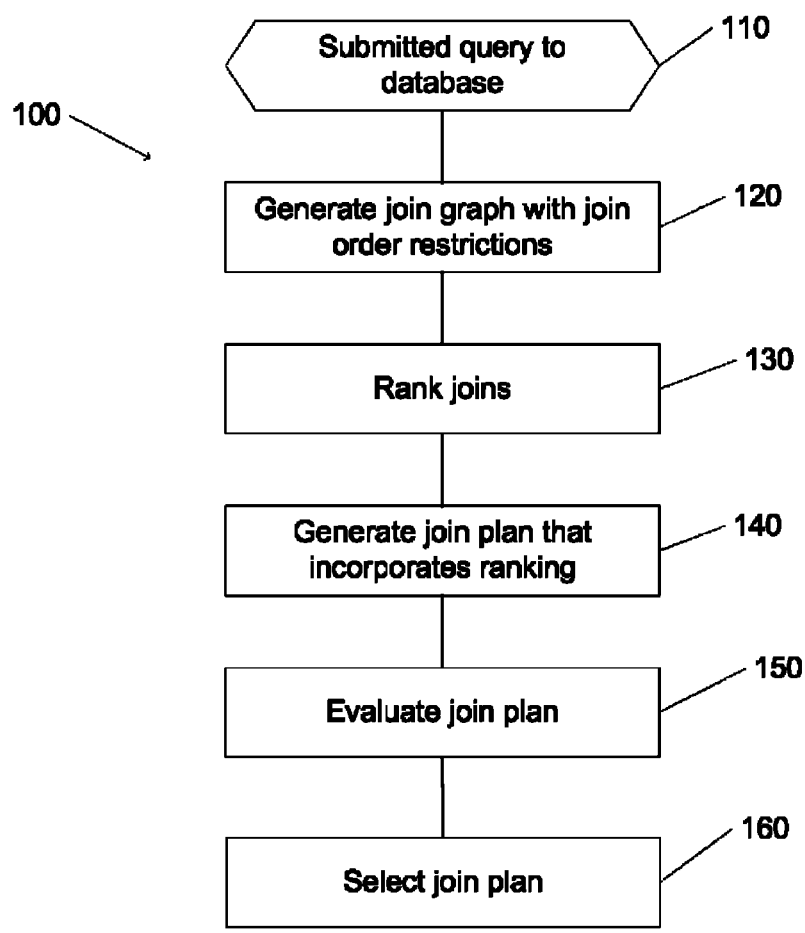
FIG. 4 is a flowchart depicting an example of a method for query optimization using join order restrictions.

FIG. 4 is a flowchart depicting an example of a method for query optimization using join order restrictions.

Query optimization method 100 may be executed by a processor of a system for query optimization using join order restrictions. Query optimization method 100 may be executed by a query optimization application. For example, query optimization method 100 may be executed whenever a query is submitted to a database that the query optimization application is configured to be associated with.

It should be understood with respect to the flowchart that the division of the illustrated method into discrete operations represented by blocks of the flowchart has been selected for convenience and clarity only. Alternative division of the illustrated method into discrete operations may be possible with equivalent results. Such alternative division of the illustrated method into discrete operations should be understood as representing other examples of the illustrated method.

Similarly, it should be understood that, unless indicated otherwise, the illustrated order of execution of the operations represented by blocks of the flowchart has been selected for convenience and clarity only. Operations of the illustrated method may be executed in an alternative order, or concurrently, with equivalent results. Such reordering of operations of the illustrated method should be understood as representing other examples of the illustrated method.

Query optimization method 100 may be executed when a query is submitted to a database (block 110). The query as submitted implicitly defines an order of joins between those tables of the database that participate in the query. The order of join of the query as submitted is representable by a join tree. Different projections of tables of the database may be considered separately.

The query as submitted is analyzed by a restricted join graph generator in order to generate any join order restrictions and to create a re-orderable (join graph) representation of the query (block 120).

For example, generation of a join order restriction by the restricted join graph generator may include examining syntactical relationships among the joins of the query. This may be visualized as a recursive traverse of the join tree that represents the query as submitted. Lists of relations for each join of the query (nodes of the join tree) may be generated. Such relation lists may include a list of all tables (leaves) below (that are joined by) that join, a list of all tables below that join that are joined by an inner join, and whether or not that join (node) may provide a null value (e.g. when a join criterion is not satisfied) in an outer join that is represented by another node immediately above the node in question (e.g. the node in question is on the left side of a right join, or is on the right side of a left join).

A function of a restricted join graph generator may return a list of nodes of a join graph to which join order restrictions are to be added.

A join graph representation of the query (to be understood as including any equivalent or similar representation of the query) that is generated by the restricted join graph generator incorporates any generated join order restrictions.

For example, the join graph representation may include join information for every join in the query. Join information regarding a join may list a minimum number of tables and joins that are required to be executed prior to executing the join to which the join information applies. It may also list those tables that are syntactically below the join. Prior examples showed how the minimum tables are used to create join order restrictions to maintain desired results. As another example, a join graph representation may use the tables that are syntactically below a join. This would force the join order to remain as was implicitly defined by the input query.

In a join graph that corresponds to the query, generated join order restrictions may be represented as a particular type of node in a disconnected join graph. The join order restriction node is joined by an edge to another node, indicating that the join that is indicated by the join order restriction node is to be joined to another table or join result. The join order restriction node includes an indication that the join that the join order restriction node represents is to be executed prior to the join that is indicated by the edge.

A join ranker assigns a rank (priority) to each join of the query, the ranking incorporating any generated join order restrictions (block 130). The ranking indicates which joins, if any, are to be executed prior to other joins such that the results of the query are not affected. The join ranker assigns ranks in such a manner as to ensure that any join that is included under a join order restriction is not assigned a priority below (or numerical rank greater than) that assigned to any joins of another node to the join order restriction node.

A join order generator generates one or more join plans that are based on the ranking of the various joins of the query (block 130). Where two or more joins are assigned equivalent ranks, two or more join plans may be generated.

Examples of assigning ranks to joins were discussed previously in connection with FIG. 1B and FIG. 2B. The numbers that indicated the ranks indicate an order in which the joins are performed.

In the example of FIG. 1B, both the join represented by edge 17a and the join represented by edge 17b have been assigned equal ranks of 1. Thus, the order of the indicated joins does not affect the results of the query. Thus, a join order generator may generate one join plan in which the join that is represented by edge 17a (of table A to table B) is performed prior to the join that is represented by edge 17b (of the result of the join of edge 17a to table C). The join order generator may similarly generate another join plan in which the join that is represented by edge 17b (of table B to table C) is performed prior to the join that is represented by edge 17a (of the result of the join of edge 17b to table A).

On the other hand, in the example of FIG. 2B, the join represented by edge 16a is assigned a rank of 1. Join order restriction node 18, in turn, represents the join that is represented by edge 16a in the join that is represented by edge 16b. The join that is represented by edge 16b has been assigned a rank of 2. The ranking of edges 16a and 16b indicates that in order to avoid affecting results of the represented query, the join that is represented by edge 16a is executed before executing the join that is represented by edge 16b. Thus, a join order generator is constrained to generate a single join plan in which the join that is represented by edge 16a (of table A to table B) is performed prior to the join that is represented by edge 17b (of the result of the join of edge 16a to table C).

Figure 5:
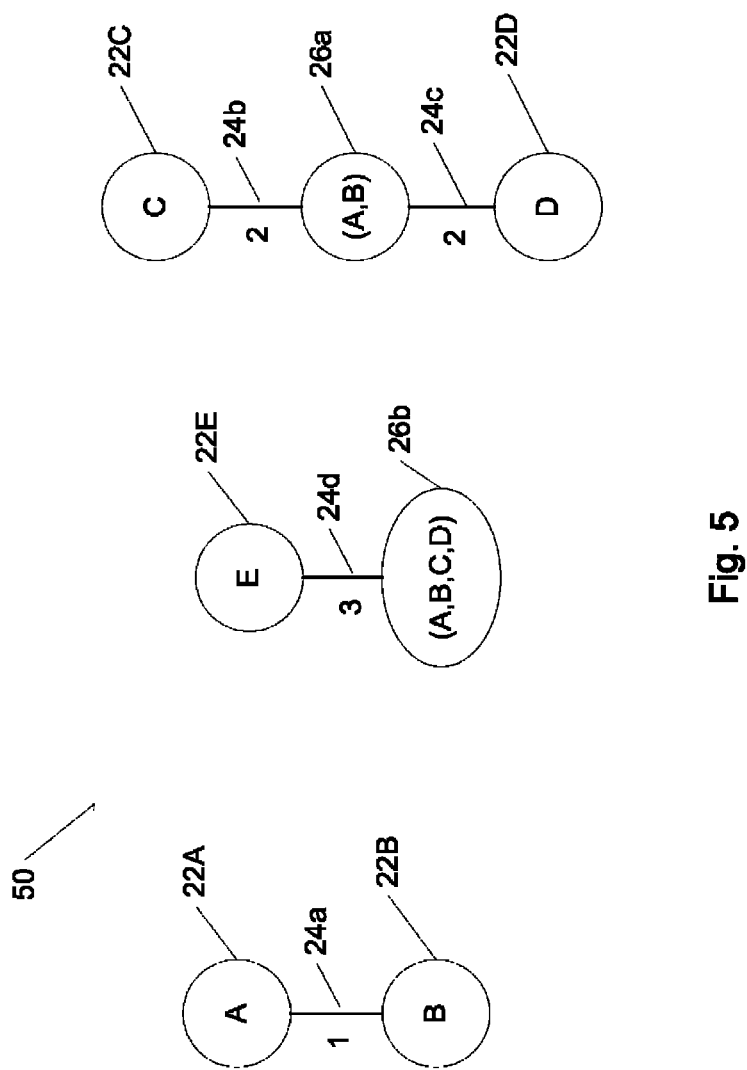
FIG. 5 is a join graph representing an example of a query with multiple join order restrictions.

FIG. 5 is a join graph representing an example of a query with multiple join order restrictions. Join graph 50 represents a query that is subject to multiple join order restrictions. In the example shown, nodes 22A through 22E represent tables A through E, respectively. As shown, a restricted join graph generator has determined that the join that is represented by edge 24a is to be executed prior to the joins that are represented by edges 24b and 24c. This priority is indicated by join order restriction node 26a. However, there is no priority between the joins that are represented by edges 24b and 24c. Thus, a join ranker has assigned a rank of 1 to the join that is represented by edge 24a, and a rank of 2 to each of the joins that are represented by edges 24b and 24c.

Similarly, the joins that are represented by edges 24b and 24c are to be performed prior to the join that is represented by edge 24d. This priority is indicated by join order restriction node 26b. The join ranker has thus assigned a rank of 3 to the join that is represented by edge 24d.

A join order generator may generate one join plan in which the join that is represented by edge 24b (of the join result that is represented by join order restriction node 26a to table C) is performed prior to the join that is represented by edge 24c (of the result of the join of edge 24b to table D). The join order generator may similarly generate another join plan in which in which the join that is represented by edge 24c (of the join result that is represented by join order restriction node 26a to table D) is performed prior to the join that is represented by edge 24b (of the result of the join of edge 24c to table C). The orders of all other joins are constrained by the ranking.

Figure 6:
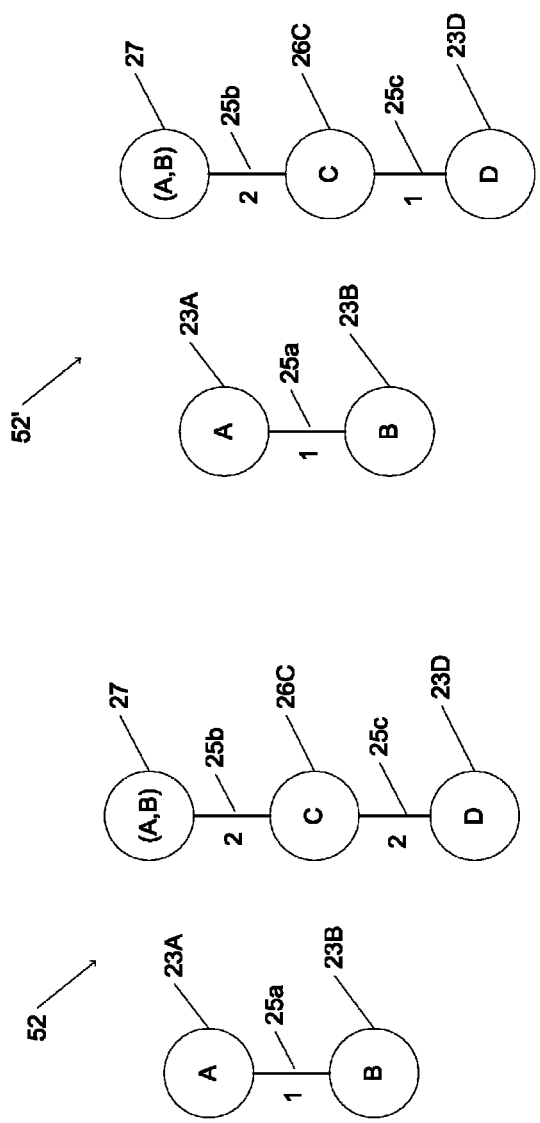
FIG. 6 is a join graph showing examples of alternative join rankings based on a single join graph that includes a join order restriction.

FIG. 6 is a join graph showing examples of alternative join rankings based on a single join graph that includes a join order restriction. In the example shown, nodes 22A through 22D represent tables A through D, respectively. A restricted join graph generator has determined that the join that is represented by edge 25a is to be executed prior to the joins that are represented by edges 25b and 25c. The priority is indicated by join order restriction node 27. A join ranker has therefore assigned a rank of 1 to the join that is represented by edge 25a, and a rank of 2 to the join that is represented by edge 25b.

However, no priority is determined between the joins that are represented by edges 25a and 25c, nor between the joins that are represented by edges 25b and 25c. Therefore, a join ranker may assign alternative rankings to the join that is represented by edge 25c. These alternative rankings are illustrated by alternative join graphs 52 and 52'.

In first alternative join graph 52, the join that is the join that is represented by edge 25c has been assigned a rank of 2, equal to the rank that was assigned to the join that is represented by edge 25b. In alternative join graph 21', the join that is the join that is represented by edge 25c has been assigned a rank of 1, equal to the rank that was assigned to the join that is represented by edge 25a.

As a result the ranking in first alternative join graph 52, a join order generator may generate one join plan in which the join that is represented by edge 25*b* (of the join result that is represented by join order restriction node 27 to table C) is performed prior to the join that is represented by edge 25*c* (of the result of the join of edge 25*b* to table D). The join order generator may similarly generate another join plan in which in which the join that is represented by edge 25*c* (of table C to table D) is performed prior to the join that is represented by edge 25*b* (of the result of the join of edge 25*c* to the join result that is represented by join order restriction node 27). Both of these joins are constrained by the ranking to be executed after the join that is represented by edge 25*a*.

As a result the ranking indicated in second alternative join graph 52', a join order generator may generate one join plan in which the join that is represented by edge 25*a* (of table A to table B) is performed prior to the join that is represented by edge 25*c* (of table C to table D). The join order generator may similarly generate another join plan in which in which the join that is represented by edge 25*c* (of table C to table D) is performed prior to the join that is represented by edge 25*a* (of table A to table B). Both of these joins are constrained by the ranking to be executed prior to the join that is represented by edge 25*b* (of the results of all of the joins represented by edges 25*a* and 25*c* to the join result that is represented by join order restriction node 27).

Each generated join plan may be evaluated, e.g. in light of an optimization criterion (block 150). For example an optimization criterion may be based on an estimated time, or an estimated use of computation resources, that is required for executing the query whose joins are ordered in accordance with a join plan under consideration. Such use of time or resources may be minimized for an optimal join plan. All such optimization considerations may be summarized by a cost function that is applied to the join plan. In this case, an optimal join plan may be that generated join plan to which application of the cost function yields a minimum cost value.

One of the join plans is selected for execution of the query (block 160). For example, a selected join plan may be an optimal join plan as determined by the evaluation. The query that incorporates the selected join plan may be returned by the query optimizer. The selected query may be executed so as to obtain a query result.

In accordance with an example of query optimization using join order restrictions, a computer program application stored in a computer-readable medium (e.g., register memory, processor cache, RAM, ROM, hard drive, flash memory, CD ROM, magnetic media, etc.) may include code or executable instructions that when executed may instruct or cause a controller or processor to perform methods discussed herein, such as an example of a method for query optimization using join order restrictions. The computer-readable medium may be a non-transitory computer-readable medium including all forms and types of computer-readable media except for a transitory, propagating signal.

We claim:

1. A method comprising:
analyzing, by a processor of a computing device, a query submitted to a database to determine a join order restriction that is associated with a join between two tables of a plurality of tables of the database that participate in the query, the join order restriction constraining its associated join to be executed prior to another join of the query, wherein analyzing the query to determine the join order restriction comprises:
determining a join order that produces a different result than a result obtained by executing the query according to a join order semantically expressed in the query; and
constructing the join order restriction to exclude the determined join order that produces the different result, from join plans for executing the query;
assigning a ranking of priority to each join between tables that participate in the query based on the join order restriction, including assigning a join associated with the join order restriction a lower priority than other joins in the query, wherein a join that was assigned a higher priority is executed prior to a join that was assigned a lower priority;
generating the join plans for executing the query constrained by the join order restriction, the join plans including different join orders;
selecting a join plan from the join plans for execution of the query; and
executing, by the processor, the query based on the selected join plan.

2. The method of claim 1, wherein selecting the join plan for execution of the query comprises evaluating an optimization criterion for each join plan of the join plans.

3. The method of claim 2, wherein the optimization criterion is related to an estimated execution time of the query that is executed in accordance with the join plan or to an estimated quantity of a resource that is utilized by the query that is executed in accordance with the join plan.

4. The method of claim 2, wherein the optimization criterion comprises a cost value assigned to each join plan, and wherein the selected join plan is the join plan whose assigned cost value is smallest.

5. The method of claim 1, further comprising:
representing the join order restriction by a plurality of ranks assigned to edges of a graph such that a join associated with a higher rank of the plurality of ranks is to be performed before a join associated with a relatively lower rank of the plurality of ranks.

6. A non-transitory computer readable storage medium storing instructions that when executed by a processor of a computing device cause the processor to:
obtain a query that is submitted to a database, the query expressible as including a plurality of joins, each join joining two tables of a plurality of tables of the database that participate in the query;
analyze the query to determine a join order restriction that is associated with a join of said plurality of joins, the join order restriction constraining its associated join to be executed prior to another join of said plurality of joins, wherein to analyze the query to determine the join order restriction, the processor is to determine a join order that produces a different result than a result obtained by executing the query according to a join order semantically expressed in the query, and construct the join order restriction to exclude the determined join order from join plans for executing the query;
assign priority rankings to the plurality of joins in the query, wherein to assign the priority rankings to the plurality of joins in the query, the instructions are to cause the processor to assign the join associated with the join order restriction a lower priority ranking than other joins in the query;
generate the join plans constrained by the join order restriction and the priority rankings;
select a join plan from the join plans for execution of the query; and
execute the query based on the selected join plan.

7. The non-transitory computer readable storage medium of claim 6, wherein a join that was assigned a higher priority ranking is executed prior to a join that was assigned a lower priority ranking.

8. The non-transitory computer readable storage medium of claim 7, wherein the join plans are generated when two of said plurality of joins are assigned equal priorities, such that those joins with the equal assigned priorities are executed in a different order in the join plans.

9. The non-transitory computer readable storage medium of claim 6, wherein to select the join plan, the instructions are to cause the processor to evaluate comprises evaluation of an optimization criterion for each join plan of the join plans.

10. The non-transitory computer readable storage medium of claim 9, wherein the optimization criterion for each join plan is related to an estimated execution time of the query in accordance with the join plan or to an estimated quantity of a resource that is utilized by the query that is executed in accordance with the join plan.

11. The non-transitory computer readable storage medium of claim 9, wherein the evaluated optimization criterion for each join plan comprises a cost value that is assigned to that join plan and wherein the selected join plan is a join plan whose assigned cost value is smallest.

12. A system comprising:
   a processing unit; and
   a non-transitory computer readable medium storing a set of instructions that when executed by the processing unit cause the processing unit to:
      obtain a query submitted to a database;
      express the query as a plurality of joins, each join joining two tables of a plurality of tables of the database that participate in the query;
      analyze the query to determine a join order restriction associated with a join of said plurality of joins, the join order restriction constraining its associated join to be executed prior to another join of said plurality of joins, wherein to determine the join order restriction, the processing unit is to determine a join order that produces a different result than a result obtained by executing the query according to a join order semantically expressed in the query, and construct the join order restriction to exclude the determined join order from join plans for execution of the query;
      assign a priority ranking to each join of said plurality of joins of the query, wherein to assign a priority ranking to each join, the set of instructions is to cause the processing unit to assign the join associated with the join order restriction a lower priority ranking than other joins in the query;
      generate the join plans including different join orders constrained by the join order constraint and the priority rankings;
      select a join plan from the join plans based on an optimization criterion; and
      execute the query based on the selected join plan.

13. The system of claim 12, wherein a first join of the plurality of joins assigned with a higher priority ranking is to be performed prior to a second join of the plurality of joins assigned with a relatively lower priority ranking.

14. The system of claim 12, wherein the set of instructions when executed by the processing unit cause the processing unit to represent the join order restriction by a plurality of ranks assigned to edges of a graph such that a join associated with a higher rank of the plurality of ranks is to be performed before a join associated with a relatively lower rank of the plurality of ranks.

15. The system of claim 12, wherein the optimization criterion comprises an estimated execution time of the query in accordance with each join plan of the join plans.

16. The system of claim 12, wherein the optimization criterion comprises an estimated quantity of a resource that is utilized by a query that is executed in accordance with each join plan of the join plans.

* * * * *